US006805238B2

(12) United States Patent
Iandoli et al.

(10) Patent No.: US 6,805,238 B2
(45) Date of Patent: Oct. 19, 2004

(54) APPARATUS FOR HOLDING A MEDIA STORAGE DISK (75) Inventors: Raymond Charles Iandoli, Longwood, FL (US); Robert Czajkowski, Tinley Park, IL (US); Heinrich M. Prost, Lombard, IL (US)

(73) Assignee: Cammy Magnetech Company, Ltd., Hong Kong (CN)

( * ) Notice: Subject to any disclaimer, the term of this patent is extended or adjusted under 35 U.S.C. 154(b) by 83 days.

(21) Appl. No.: 10/120,775

(22) Filed: Apr. 10, 2002

(65) Prior Publication Data

US 2003/0019771 A1 Jan. 30, 2003

Related U.S. Application Data (60) Provisional application No. 60/308,173, filed on Jul. 27, 2001.

(51) Int. Cl.[7] .............................................. B65D 85/57
(52) U.S. Cl. ..................................... 206/310; 206/308.1
(58) Field of Search .............................. 206/307, 308.1, 206/308.2, 310, 493; B65D 85/57

(56) References Cited

U.S. PATENT DOCUMENTS

| | | | |
|---|---|---|---|
| 5,400,902 A | * | 3/1995 | Kaminski |
| 5,788,068 A | * | 8/1998 | Fraser et al. |
| 5,944,181 A | | 8/1999 | Lau |
| 6,016,909 A | | 1/2000 | Chang |
| 6,123,192 A | | 9/2000 | Rufo, Jr. |
| 6,206,186 B1 | | 3/2001 | Cerda-Vilaplana et al. |
| 6,227,362 B1 | | 5/2001 | Cheung |
| 6,237,763 B1 | | 5/2001 | Lau |
| 6,401,920 B2 | * | 6/2002 | Gelardi |

FOREIGN PATENT DOCUMENTS

| | | | |
|---|---|---|---|
| JP | 2001-48272 | * | 2/2001 |
| JP | 2001-301866 | * | 10/2001 |

* cited by examiner

Primary Examiner—David T. Fidei
(74) Attorney, Agent, or Firm—Norman A. Nixon; Beusse Brownlee Wolter Mora & Maire, P.A.

(57) ABSTRACT

An apparatus for releasably holding a media storage disk that may include a front and base cover connected in a hinged relationship. A base panel of the base cover may include a centrally located hub disposed on a pair of support arms that may be moved between a relaxed position and a flexed position. The hub may include a plurality of retaining lips that will retain a disk when placed on the hub. A release button may also be provided that cooperatively engages the hub to move the hub between a relaxed position and a flexed position. The release button may cooperatively engage a pair of cam followers situated on the hub so that when the release button is depressed the hub moves between the relaxed position and the flexed position. With a disk held on the hub, when the release button is depressed the hub moves to its flexed position, which retracts the retaining lips within the inside diameter of the center hole of the disk so that the disk may be removed from the hub. At least one stem may also be provided that extends from the inside of a spine connecting the front and base covers such that the stem will abut a portion of the disk's peripheral edge when the apparatus is closed to hold the disk in place. A plate extending from the inside of the front cover may also be provided such that a portion of the plate will abut a portion of the disk's peripheral edge when the apparatus is closed to hold the disk in place.

25 Claims, 6 Drawing Sheets

APPARATUS FOR HOLDING A MEDIA STORAGE DISK

SPECIFIC DATA RELATED TO THE INVENTION

This application claims the benefit of U.S. provisional application, Ser. No. 60/308,173, filed Jul. 27, 2001.

BACKGROUND OF THE INVENTION

This invention relates to an apparatus for securely retaining a media storage disk such as a compact disk (CD), a digital video disk (DVD), a video compact disk (VCD) or other such planar disks having a centrally disposed aperture. More particularly, this invention relates to an apparatus or case that may be used to securely retain and protect a disk for purposes of retail sale, transportation or storage and permits an easy release of the disk for removal from the case.

Media storage disks have soared in popularity in recent years due to the high demand for portable media capable of storing large volumes of data. Media storage disks typically have large amounts of digitally stored information that may be optically readable through a transparent bottom layer of the disk by a movable head during rotation of the disk. Normal handling and transportation of the disk may result in damage to the bottom layer, which may result in a loss of data and consequently render the contents of the disk unusable resulting in an economic loss to the end user. Consequently, industry has provided a wide range of protective containers for such disks to ensure that they are not damaged during events such as consumers inspecting the container at the point of sale, transportation or storage. Protective containers in common use typically include some form of a pedestal protruding from one cover of the container that will engage the center hole of a disk and keep it in place within the container. Typically the pedestal will grasp the disk in some manner to prevent the disk from moving around while in the container. It is also common to provide a mechanism for allowing the disk to be removed from the grasp of the pedestal so the disk may be removed from the protective container and used. A common aspect of known pedestals and mechanisms for releasing a disk from the pedestal is that when pressure is exerted on the releasing mechanism some force is transferred onto at least a portion of the disk making the disk susceptible to damage. While such forces do not usually subject a disk to acute damage or breakage, repeated removal of a disk from such a mechanism may sufficiently fatigue the disk over time that it may crack and consequently damage some of the stored data. The end user may then have to purchase a replacement disk at the retail cost.

One very popular use for media storage disks such as DVDs is for storing information representing full-length motion pictures, other entertainment programs or applications software programs represented by a large volume of data stored on a disk. CDs are also extremely popular for distributing music. Many uses for media storage disks, such as those listed above, involve the retail sale or rental of disks through a wide range of distributions channels where a consumer may handle the protective container prior to purchasing or renting. For example, the rental and sale of movies on such disks has exploded in the recent past. One problem confronting the disk rental and sale industry is theft of the disks by removing them from their protective container without opening the container. It has apparently become known that a disk may be released from the pedestal holding the disk in place and that the disk may subsequently be removed from the container by slipping the disk between a front and back cover of the container without actually opening the container.

In view of the above, it would be advantageous to provide a protective container that could releasably hold a disk where the releasing mechanism minimizes or eliminates the amount of downward force exerted on the disk while being released. It would also be advantageous to provide a protective container designed to prevent a disk from being removed from the container when the disk is accidentally released from the mechanism holding the disk within the container.

BRIEF SUMMARY OF THE INVENTION

One exemplary embodiment of the present invention provides an apparatus for releasably holding a media storage disk on a centrally located hub where a means for releasing the disk from the hub transfers force away from the disk when the disk is being released. The apparatus may include a base panel within which the hub is situated where the hub may be moveable between a relaxed position and a flexed position. Means for supporting the hub within the base panel may also be provided where the supporting means may also be moveable between a relaxed position and a flexed position. With a disk in place over the hub means may be provided for retaining the disk on the hub.

One exemplary embodiment of the present invention allows for an apparatus having a front cover and a base cover connected in a hinged relationship by a spine such that the front and base cover may be moved between an open and closed position. The hinged relationship may be formed as an integral part of the apparatus by what is known in the art as "living hinges", for example. Alternate embodiments may employ a variety of techniques known in the art for creating the hinged relationship between the front and base cover. A center retainer may be provided in a base panel of the base cover. The center retainer may include a hub over which the center hole of a standard media storage disk may be placed so that the disk may be secured within the apparatus. The hub may include means for retaining the disk on the hub and the hub may be integrally formed with a means for supporting the hub within the base panel of the apparatus. In one exemplary embodiment of the present invention the hub may include two pair of floating segments that may be moved between a relaxed position and a flexed position. The means for retaining the disk on the hub may be disposed at or near the top of each floating member and may be a retaining lip that extends beyond an edge of each floating segment. When a disk is placed over the hub, the hub may move to a flexed position, which facilitates movement of the disk below the retaining lips. With the disk past the retaining lips, the hub may expand to its relaxed position so that the retaining lips are positioned above the upper surface of the disk.

Another exemplary embodiment of the present invention allows for providing a means for biasing the disk in an upward direction while secured on the hub and when the disk is being released from the hub. The means for biasing may be a plurality of cantilever arms symmetrically disposed around the hub. Each cantilever arm may include a stop near its distal end that may abut the underside of the disk when placed over the hub. The means for biasing may urge the disk in an upwardly direction so that a portion of the disk is sandwiched between the stops and the underside of the retaining lips to help hold the disk in place on the hub. The means for biasing may also urge the disk in an upwardly direction for facilitating release of the disk from the hub for removal from the apparatus.

Means for releasing the disk from the hub may be provided and may include in one exemplary embodiment a release button that cooperatively engages the hub. The release button may include a pair of cam profiles that engage a corresponding pair of cam followers situated between the floating segments of the hub. As the release button is pushed downwardly or depressed the cam followers move in response to the cam profiles to urge the floating segments toward each other to their flexed position. In this position the retaining lips are retracted within the diameter of the disk's center hole so that the disk may be removed from the hub. When the release button is depressed the retaining lips move substantially laterally along the upper surface of the disk so that little to no downward force is exerted on the disk that may cause damage to the disk. The configuration and interaction of the retaining lips, release button, cam followers and hub cause the majority of the force exerted when releasing the disk from the hub to be distributed throughout the components of the center retainer and apparatus and minimizes the amount of force transferred to the disk. Means for retaining the release button on the hub may also be provided and may include a plurality of protuberances extending from the leg of the release button. The protuberances may be rounded with the distance between two adjacent apexes of two protuberances along a common longitudinal axis being slightly larger than a gap formed between two retaining lips on adjacent floating segments. In this respect, the release button may be placed on the hub by pushing the protuberances through the gap. The lower surface of the retaining lips and the protuberances retain the release button on the hub unless sufficient force is exerted upwardly for removal of the release button.

Another aspect of the present invention allows for a means for holding a disk securely in place while the apparatus is in its closed position. In this respect, the means for holding may hold the disk in place while the disk is secured over the hub and/or when the disk is released from the hub but the apparatus is still closed. The means for holding the disk prevents the disk from being removed from the apparatus when the apparatus is closed and may include at least one stem extending substantially perpendicularly from the inside of the spine that connects the front and base cover in hinged relationship. When the apparatus is closed, a distal end of the stem may be situated just above or abut the peripheral edge of the disk. The means for holding may also include a plate extending from an inside edge of the front cover such that when the apparatus is closed a portion of the plate aligns with a portion of the disk's peripheral edge on an opposite side of the disk from the stem. In one exemplary embodiment of the present invention the plate may include at least one protuberance extending toward the disk when the apparatus is closed such that the protuberance will be immediately above or abut the peripheral edge of the disk. The stem and plate cooperate to hold the disk in place within the apparatus when closed. Another embodiment may include a plurality of protuberances disposed on the plate that define a radius of curvature corresponding to the radius of curvature of the disk. This feature of the present invention provides a significant advantage over prior art devices, which are susceptible to having disks stolen form the protective containers when closed.

DETAILED DESCRIPTION OF THE INVENTION

Figure 1:
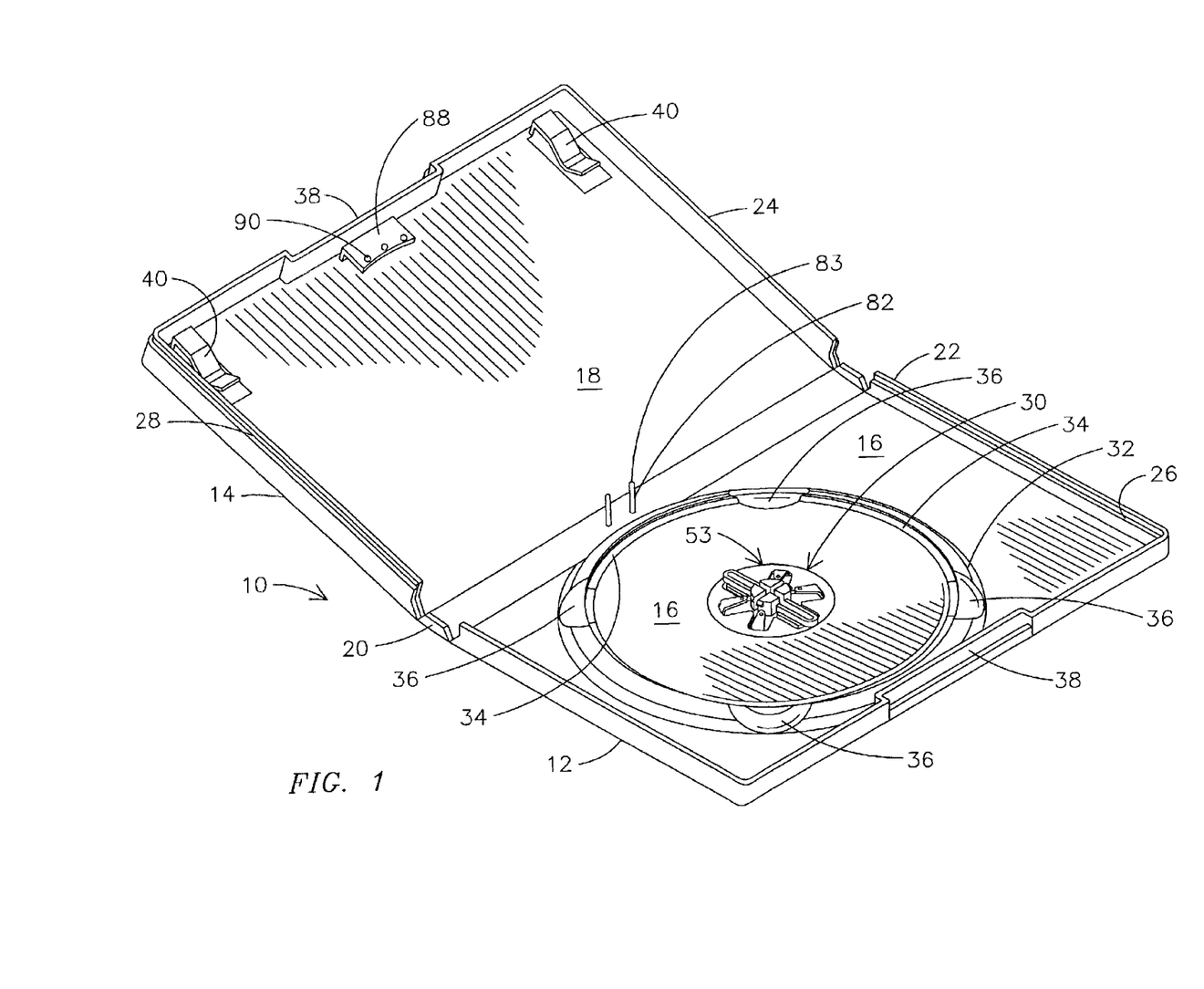
FIG. 1 is a perspective view of an exemplary embodiment of the present invention in its open position.

FIG. 1 illustrates an exemplary embodiment of a case 10 for holding a media storage disk in accordance with one aspect of the present invention. Case 10 may include a base cover 12 and a front cover 14 that may be connected via a hinge relationship formed integrally with a spine 20. For example, case 10 may be formed as a unitary structure, such as by injection molding, so that base cover 12 and front cover 14 are connected to spine 20 by virtue of so-called "living hinges", which may be formed integrally along the length of spine 20 to securely connect covers 12 and 14 with the spine 20 in a hinged relationship. Base cover 12 may include a base panel 16 and front cover 14 may include a front panel 18, both of which may be formed as an integral portion of covers 12 and 14. Covers 12 and 14 may also include a base perimeter edge 22 and a front perimeter edge 24, respectively, that may be formed integrally with covers 12 and 14. Edges 22 and 24 may include a base edge recess portion 26 and a front edge recess portion 28, respectively, each of which may be formed as an integral part of case 10. The base edge recess portion 26 may be formed so that when the case 10 is in its closed position recess portion 26 aligns with the front perimeter edge 24. Similarly, the front edge recess portion 28 may be formed so that when the case 10 is in its closed position recess portion 28 aligns with the base perimeter edge 22. In this respect, the alignment of recess portions 26 and 28 with the edge portions 22 and 24, respectively, provides a rigid perimeter to case 10 when in its closed position.

In one aspect of an exemplary embodiment of the present invention as further shown in FIG. 1 a center retainer 30 may be provided for releasably holding a media storage disk securely in place within case 10. A support ring 32 may also be provided for making the base panel 16 more rigid and for supporting a portion of a media storage disk when placed in case 10 and providing access to easily lift the disk from the center retainer 30. The support ring 32 may be formed integrally with base panel 16 and may include a stabilizing shoulder 34 adapted to support the perimeter of a media storage disk when secured on center retainer 30 in the event the disk is tilted from a horizontal relationship with center retainer 30 while secured in case 10. For example, when a disk is secured on center retainer 30 the disk may be supported by the center retainer 30 so that the perimeter of the disk is sustained slightly above the stabilizing shoulder 34. If portions of base and front panels 16 and 18 are squeezed together when case 10 is in its closed position the stabilizing shoulder 34 may support the perimeter of the disk and help to prevent the disk from becoming accidentally dislodged from the center retainer 30. Finger depressions 36 may also be provided within the support ring 32 so that an end user may easily grasp the edge of the disk for lifting it off the center retainer 30. The base perimeter edge 22 and front perimeter edge 24 may include finger recess portions 38 for grasping and separating the base cover 12 and front cover 14 to open case 10 and remove a media storage disk. Front cover 14 may also include clips 40 that may be used for retaining promotional or other literature to be included within case 10.

Figure 2:
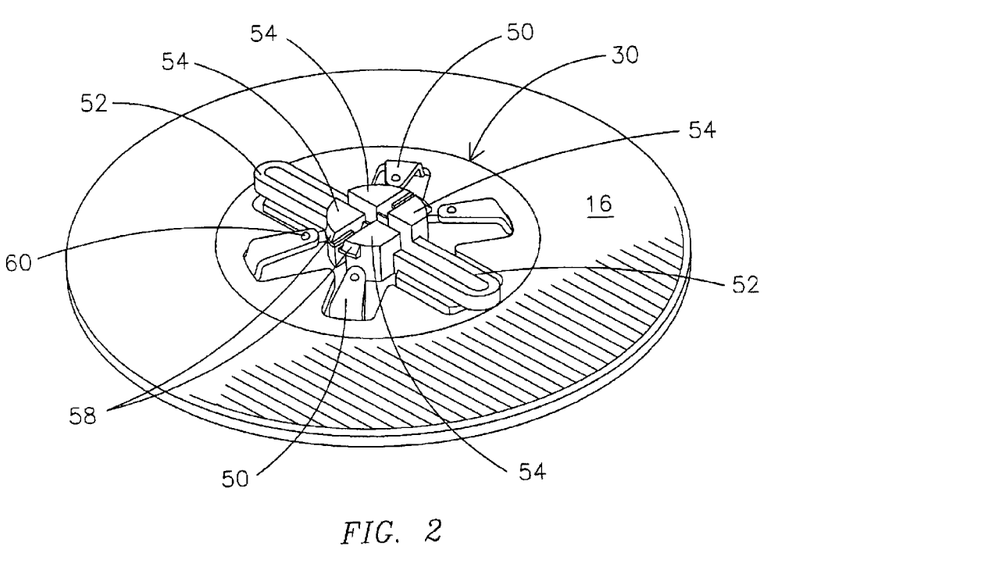
FIG. 2 is a perspective view of an exemplary embodiment of a portion of a base panel and a center retainer of the present invention as shown in FIG. 1.
Figure 4:
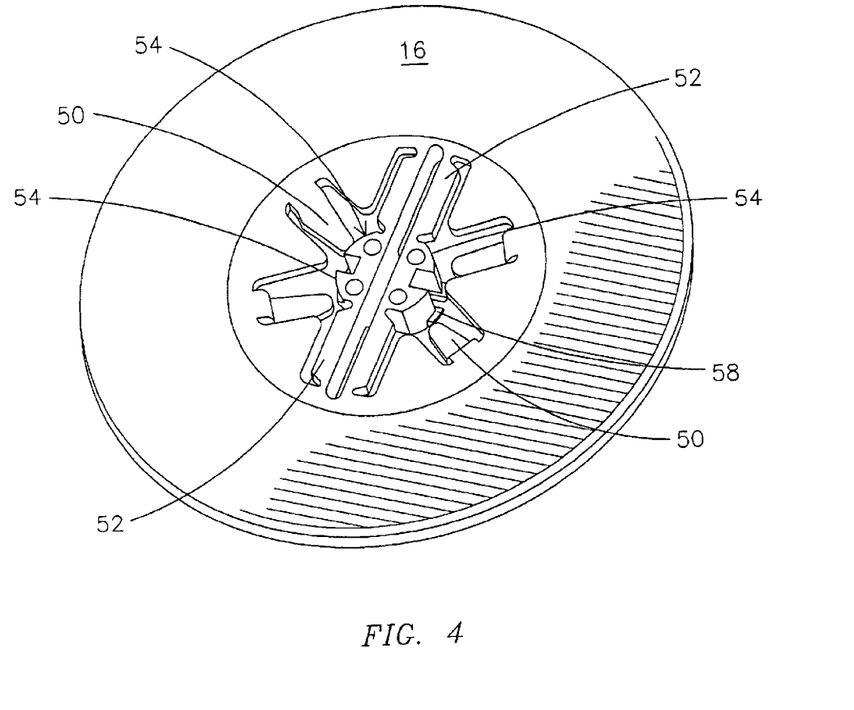
FIG. 4 is a perspective bottom view of FIG. 3.

FIG. 2 illustrates the center retainer 30 used for releasably holding a media storage disk within case 10. FIG. 4 illustrates a bottom view of the center retainer 30. The center retainer 30 may include a hub 53 centrally disposed within the base panel 16. Hub 53 may include a plurality of floating segments 54 that may be disposed on a means for supporting the hub 53 within the base panel 16. In one exemplary embodiment of the present invention the means for supporting the hub 53 may be a pair of support arms 52. Support arms 52 may be substantially parallel to each other and at least one may be constructed of a flexible and resilient material so that it may be squeezed or flexed inwardly toward the other under force to a flexed position and then return to its original or relaxed position when the force is released. An alternate embodiment allows for both support arms 52 to be constructed of a flexible and resilient material so they both may be moved between a relaxed and flexed position. Support arms 52 may be formed integrally with the base panel 16 or they may be affixed within the base panel 16 by other conventional means. In one exemplary embodiment of the present invention floating segments 54 may be integrally formed with support arms 52 or otherwise affixed to support arms 52 by conventional means. In this respect, as support arms 52 move or flex toward and away from each other the floating segments 54 will move in unison, which is in a direction that is substantially normal to the longitudinal direction of support arms 52. Support arms 52 may be formed to be rigid longitudinally so that they are substantially maintained within a plane defined by base panel 16.

Figure 5:
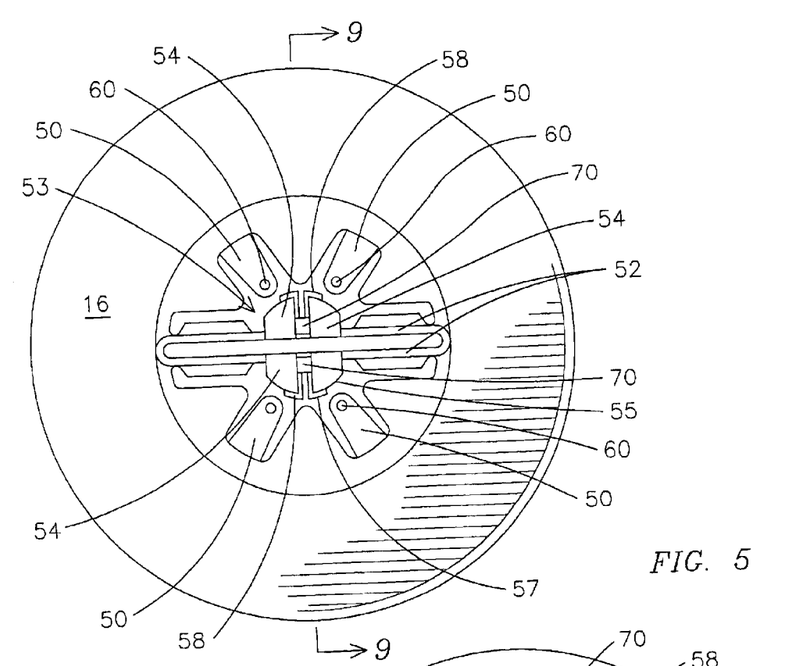
FIG. 5 is a plan view of FIG. 2.
Figure 6:
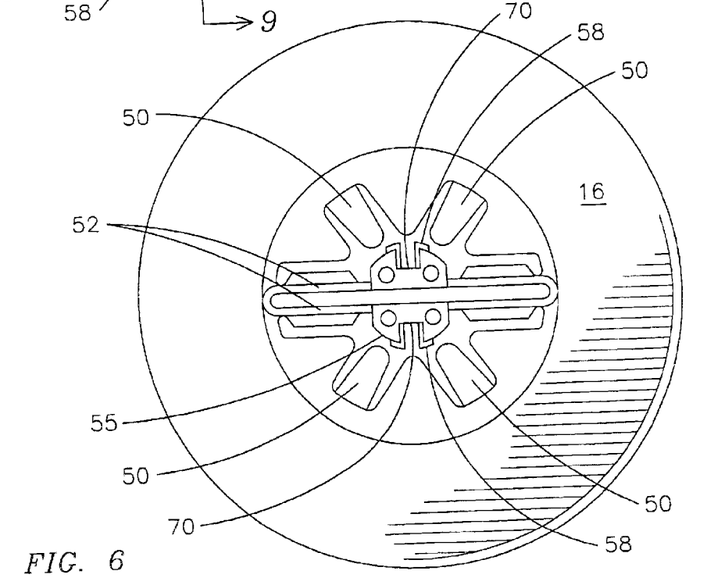
FIG. 6 is a bottom view of FIG. 5.

The center retainer 30 may include a means for biasing the disk in an upwardly direction, or a direction which is away from the base panel 16, when releasing the disk from the center retainer 30. The means for biasing the disk may urge the disk in a direction that is substantially along the longitudinal axis of the hub 53 and away from the base panel 16. In one exemplary embodiment of the present invention the means for biasing the disk in an upwardly direction may include a plurality of cantilever supports 50 that may be symmetrically disposed around the centrally located hub 53 and formed integrally within the base panel 16. In an alternate embodiment, not shown, the cantilever supports 50 may extend from one or more of the floating segments 54. One or more floating segment 54 may be provided with a means for retaining a media storage disk on the hub 53. In one exemplary embodiment of the present invention the means for retaining may be a plurality of retaining lips 58 where one retaining lip 58 may be integrally formed as part of each floating segment 54 and extend substantially perpendicularly from the longitudinal axis of the hub 53. Referring to FIG. 5, one exemplary embodiment of the present invention allows for each floating segment 54 to include a curved portion 55 that may define a radius of curvature substantially the same as the radius of curvature defined by the center hole found in most commercially available media storage disks. The end portions 57 of retaining lips 58 may also define a radius of curvature that is substantially the same as that of the center hole of a media storage disk to facilitate movement of the disk over the retaining lips 58 when the floating segments 54 are urged toward each other. Stops 60 may be provided on cantilever supports 50 to engage and support the underside of a media storage disk when retained on the hub 53. FIG. 6 illustrates a bottom view of an exemplary embodiment of the center retainer 30 and shows that the retaining lips 58 overhang the floating segments 54.

Figure 3:
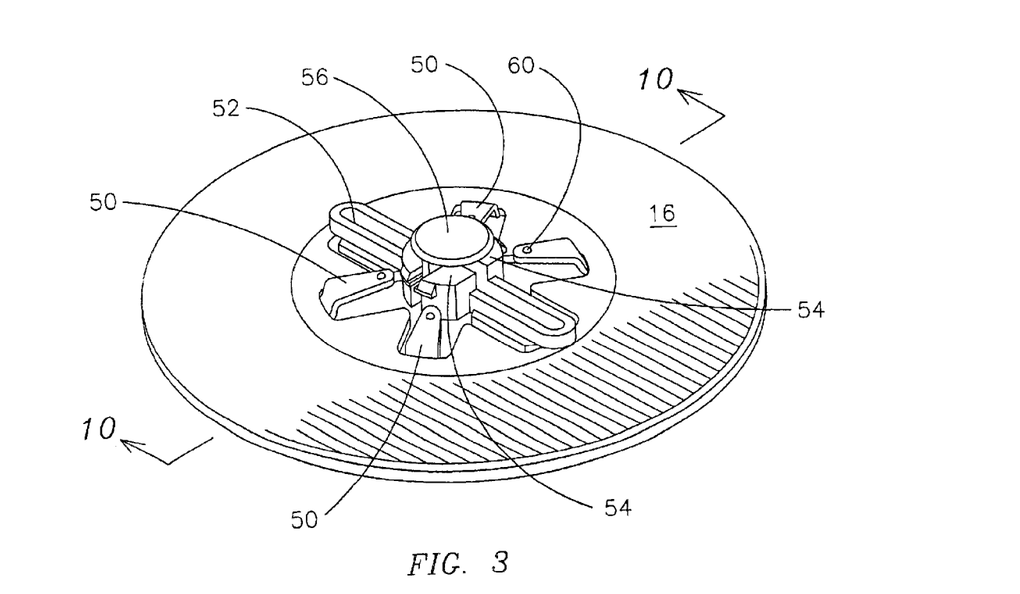
FIG. 3 is an exploded perspective view of an exemplary embodiment of a portion of the base panel and the center retainer shown in FIG. 2 having a button for causing a media storage disk to be released in accordance with one aspect of the present invention.
Figure 7:
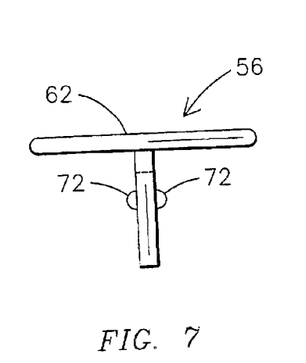
FIG. 7 is a side view of an exemplary embodiment of a release button in accordance with one aspect of the present invention.
Figure 8:
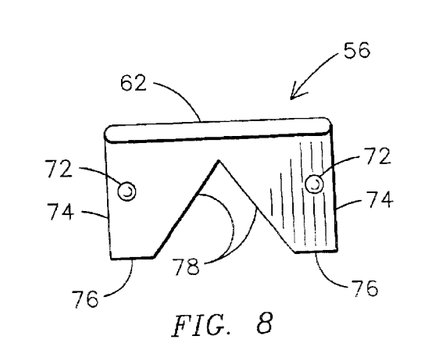
FIG. 8 is a front view of FIG. 7.
Figure 9:
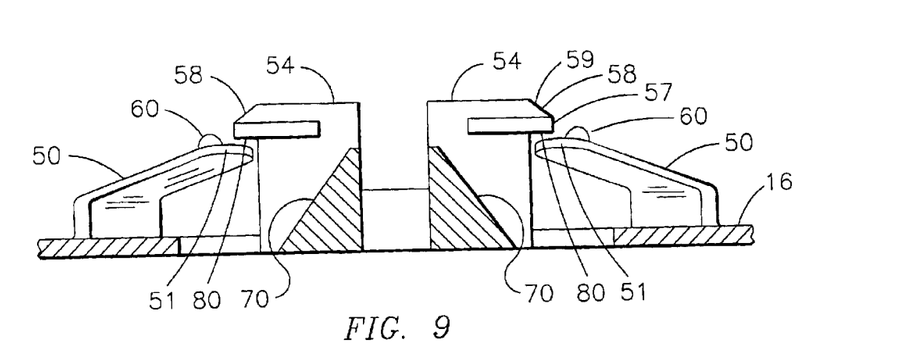
FIG. 9 is a cross-sectional view taken along line 9—9 of FIG. 5.
Figure 10:
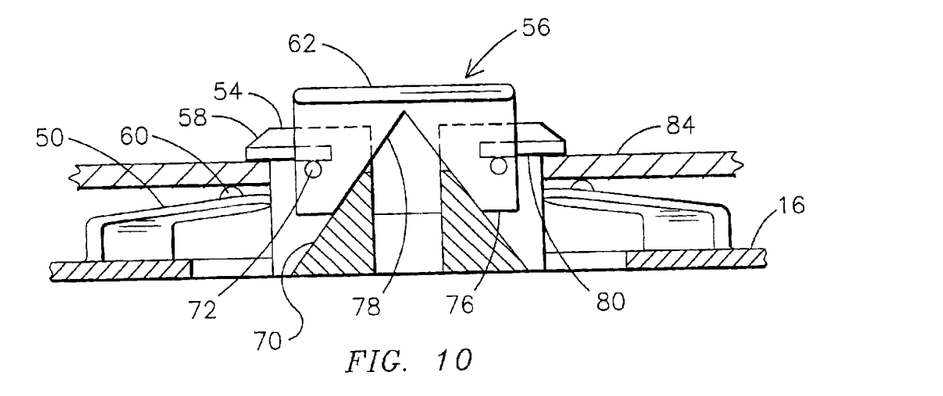
FIG. 10 is a cross-sectional view taken along line 10—10 of FIG. 3.
Figure 11:
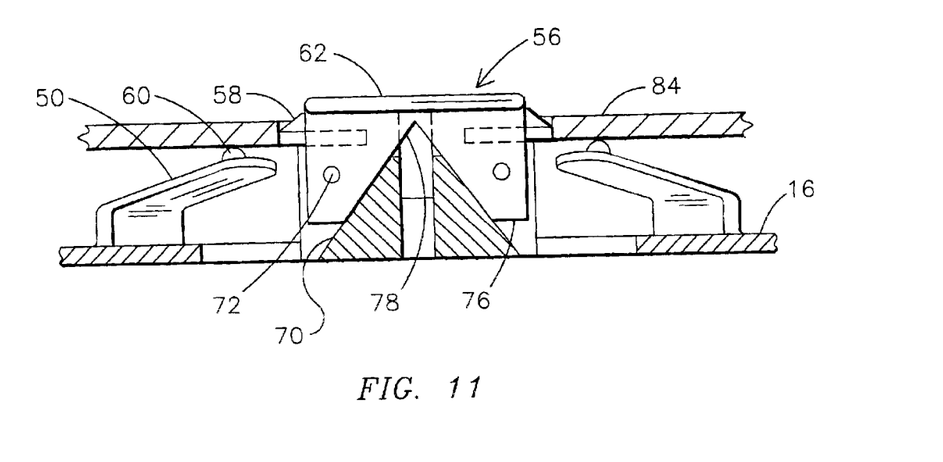
FIG. 11 illustrates the cross-sectional view of FIG. 10 with an exemplary embodiment of the invention in position to release a media storage disk from the case.

Means for releasing a media storage disk from the hub 53 may also be provided. In one exemplary embodiment of the present invention the means for releasing the disk from the hub 53 may include a release button 56 that cooperatively engages a portion of the hub 53 to move the floating segments 54 from a relaxed position to a flexed position. The means for releasing in one exemplary embodiment of the present invention may provide a cam follower 70 disposed between two floating segments 54 on each support arm 52. Each cam follower 70 may be an inclined surface as best shown in FIG. 9. Each cam follower 70 may be integrally formed as part of hub 53 and/or floating segment 54 and may be adapted to cooperatively engage release button 56. FIG. 7 illustrates an exemplary embodiment of release button 56. Release button 56 may include a substantially circular top surface 62 having a leg portion 74 extending in a substantially perpendicular manner from the top surface 62. Means for retaining the release button 56 on the hub 53 may be provided and may include protuberances 72 disposed on each side of leg portion 74. The protuberances 72 may be rounded with the distance between the apexes of two protuberances 72 having a common longitudinal axis being slightly larger than the width of a gap defined by two adjacent retaining lips 58 as best shown in FIG. 6. FIG. 10 shows the release button 56 in place on hub 53 with the protuberances 72 fitted beneath a portion of the retaining lips 58. This relationship prevents the release button 56 from becoming accidentally dislodged from hub 53. As best shown in FIG. 8 the release button 56 may include cam profiles 78 that are adapted to engage the cam followers 70 when the release button 56 is placed within the hub 53 as best shown in FIG. 3. In this position, the surfaces of cam profiles 78 engage the surfaces of cam followers 70 so that when the release button 56 is pressed downwardly the cam profiles 78 act on the cam followers 70 to cause the support arms 52 to flex inwardly toward each other, which causes the floating segments 54 to move toward each other. As shown in FIG. 11 when the release button 56 is depressed the floating segments 54 are sufficiently urged toward each other to their flexed position so that the end portions 57 of the retaining lips 58 are retracted within the inside diameter defined by a center hole on a media storage disk 84 such as a CD, for example. In this flexed position, the disk 84 may be lifted up and over the retaining lips 58 and removed from the hub 53. In an alternate embodiment of the means for releasing the disk, not shown, the hub 53 may be static and the retaining lips 58 may integral with the hub 53 by virtue of a biasing means or a spring mechanism, for example. In this respect, when the release button 56 is depressed the retaining lips 58 would retract within the inside diameter of the disk's 84 center hole without the need for the support arms 52 to flex inwardly.

FIG. 9 illustrates a cross-sectional view of the hub 53 in a relaxed position. In this relaxed position the circumference of hub 53 at or near its longitudinal midpoint may be substantially the same as the circumference defined by the center hole of disk 84. In this respect, when the hub 53 is in its relaxed position the outside surface defining the circumference of hub 53 may impinge on the inside edge of the disk's 84 center hole to help hold the disk 84 in place on the center retainer 30. When hub 53 is in its relaxed position support arms 52 are also in their relaxed position as best shown in FIG. 4. A disk 84 may be placed on the hub 53 by initially slipping the center hole of disk 84 over the release button 56 and resting the underside of disk 84 on the upper surface 59 of one or more of the retaining lips 58. In one exemplary embodiment of the present invention the upper surface 59 of each retaining lip 58 may be beveled, rounded or convex, as best shown in FIGS. 9, 10 and 11, to facilitate movement of the disk 84 past the end portions 57 of the retaining lips 58. As downward pressure or force is exerted on the disk 84 the lower surface or underside of the disk 84 moves along the upper surface 59 of the retaining lips 58 thereby urging or flexing the floating segments 54 inwardly toward each other until the end portions 57 of the retaining lips 58 are retracted within the inside diameter of the disk's 84 center hole. This allows the disk 84 to pass below the retaining lips 58. With the disk below the retaining lips 58 the floating segments 54 may move outwardly toward their relaxed position so that the retaining surface 80 of each retaining lip 58 is above the upper surface of disk 84 as shown in FIG. 10. In one exemplary embodiment of the present invention two adjacent floating segments 54 may be separated by a cam follower 70 and they may be integrally formed within each of the support arms 52. As the disk 84 moves downwardly along the upper surface 59 of the retaining lips 58 each pair of adjacent floating segments 54 is urged or flexed inwardly toward each other in response to the flexibility and resiliency of the support arms 52. In an alternate embodiment the support arms 52 may be rigid along their longitudinal axis thereby restricting or eliminating their displacement in a direction substantially normal to the longitudinal direction of the support arms 52. In such an embodiment, the floating members 54 may be urged or flexed toward each other by other means and/or the retaining lips 58 may be retracted within the inside diameter of the disk's 84 center hole by other means.

Referring to FIG. 10 the disk 84 is held in place on the hub 53 by the retaining surface 80 of retaining lips 58 being situated above the upper surface of disk 84. In one exemplary embodiment of the present invention stops 60 may be affixed near the distal end 51 of at least one cantilever support 50 against which the lower surface of the disk 84 may abut when the disk 84 is in place on or being released from the hub 53. The cantilever supports 50 in accordance with one aspect of the present invention are positioned with respect to the retaining surface 80 of the retaining lips 58 such that the distal end 51 of each cantilever support 50 is displaced downwardly when the lower surface of the disk 84 impinges on stops 60 thereby creating an upward bias against the disk 84 when secured on the center retainer 30. This means for biasing the disk 84 upwardly facilitates the removal of the disk 84 from the hub 53 when the release button 56 is depressed by urging the disk 84 above the end portions 57 of the retaining lips 58.

Figure 12:
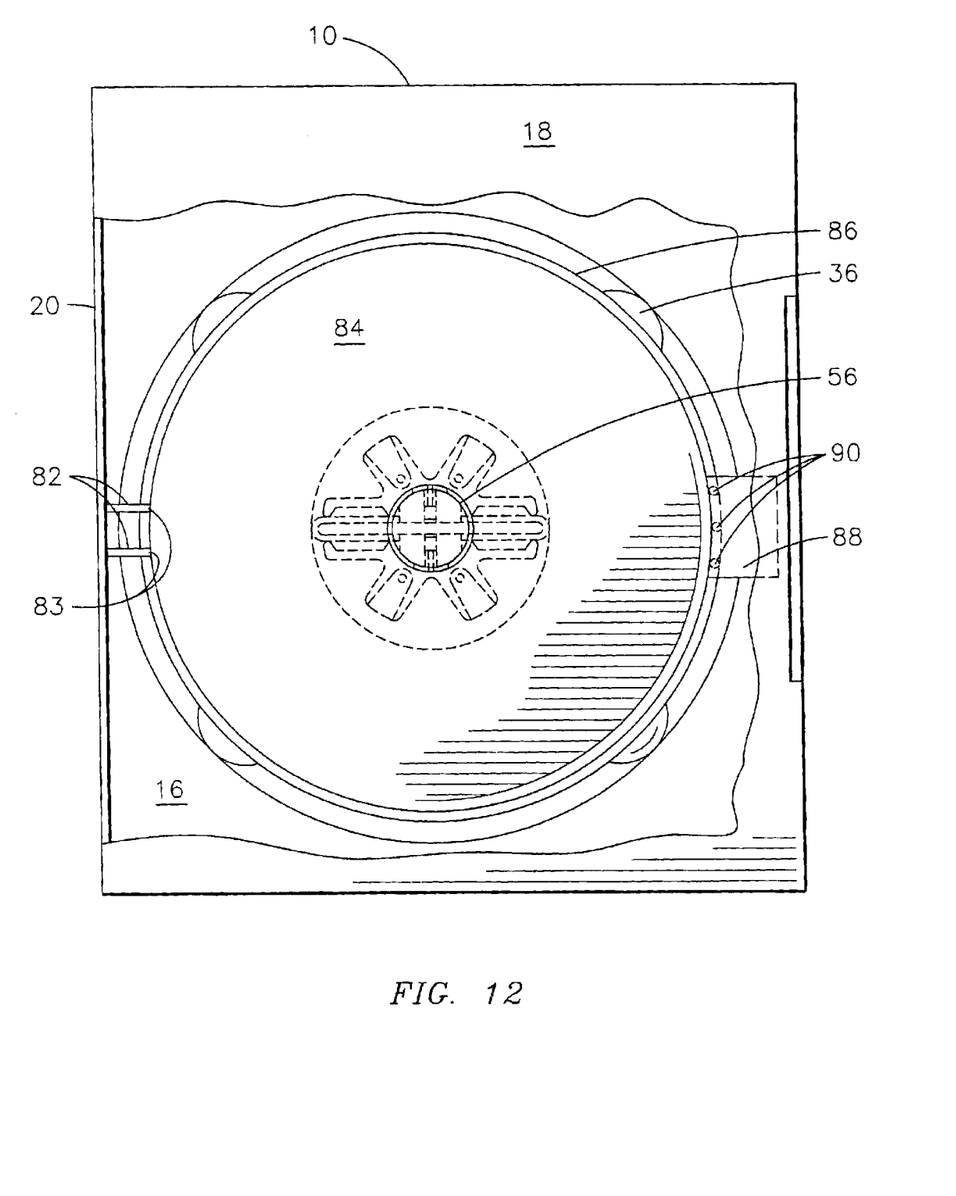
FIG. 12 illustrates a plan view of an exemplary embodiment of the present invention with a portion of a front cover broken away to show a media storage disk retained within the embodiment.

Another exemplary embodiment of the present invention may include means for securing the disk within the support ring 32 when the front cover and the base cover are in the closed position. As shown in FIG. 1, the means for securing the disk may include a plate 88 affixed to the front panel 18. Plate 88 may include one or more protuberances 90 adapted to be immediately above or engage the peripheral edge 86 of disk 84 when the case 10 is in its closed position as shown in FIG. 12. The means for securing may also include at least one stem 82 extending substantially perpendicularly from the inside of spine 20 where the distal end 83 of stem 82 is adapted to be immediately above or engage the peripheral edge 86 of disk 84 when the case 10 is in its closed position. The means for securing the disk in this manner is advantageous in that it ensures that the disk 84 is held securely in the case 10 when closed even if the disk 84 becomes released from the center retainer 30. Alternate embodiments of the means for securing the disk, not shown, may include, for example, at least one stem or post extending from the inside of the front panel 18 near the finger recess 38 adapted to engage the peripheral edge 86 of the disk 84 when case 10 is closed. Such stems or posts may also be situated on the inside of front panel 18 in plurality of locations provided they aligned with the peripheral edge 86 when case 10 is closed. For example, such posts or stems may be configured as the points of a compass that would be situated immediately above or engage the peripheral edge 86 of the disk 84 when the case 10 is closed. Another embodiment may configure the posts or stems closer together so they would align with the disk 84 close to its center hole, rather than its peripheral edge 86, when the case 10 is closed. If a sufficient configuration of posts or stems extend from the inside of front panel 18 then the stems 82 may not be necessary. Yet another configuration may be a row of posts or stems disposed horizontally and/or vertically on the inside of front cover 18 where, for example, two posts or stems may align with the disk's 84 near its center hole and two may align with its peripheral edge 86. Those skilled in the art may envision a wide range of other variations.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

We claim:

1. An apparatus for releasably holding a media storage disk comprising:
   a base panel;
   a hub moveable between a relaxed position and a flexed position, the hub comprising at least one floating segment;
   means for supporting the hub within the base panel so that the at least one floating segment moves substantially laterally between the relaxed position and the flexed position;
   means for retaining the disk on the hub; and
   means for releasing the disk from the hub whereby depressing the means for releasing causes the at least one floating segment to move substantially laterally from the relaxed position to the flexed position such that the means for retaining the disk on the hub is moved substantially laterally a distance sufficient to allow the disk to be removed from the hub.

2. The apparatus of claim 1 further comprising: means for biasing the disk upwardly when the disk is retained on the hub.

3. The apparatus of claim 1 further comprising:
a front cover;
a base cover, the base panel being disposed within the base cover;
a spine connecting the front cover with the base cover in a hinged relationship so that the front cover and base cover are moveable between an open position and a closed position; and
means for securing the disk within the apparatus when the front cover and the base cover are in the closed position.

4. The apparatus of claim 1, the means for supporting the hub within the base panel comprising:
a first support arm affixed to the base panel; and
a second support arm affixed to the base panel wherein the first and the second support arms lie in a plane that is substantially coplanar with a plane defined by the base panel.

5. The apparatus of claim 4 wherein at least one of the first support arm and the second support arm is made of a resilient material.

6. The apparatus of claim 5, the hub comprising a first floating segment affixed to the first support arm and a second floating segment affixed to the second support arm wherein the means for retaining the disk on the hub is affixed to at least one of the first and the second floating segments.

7. The apparatus of claim 1, the means for releasing the disk from the hub comprising:
at least one cam follower disposed on the hub; and
a release button comprising at least one cam profile adapted to cooperatively engage the at least one cam follower such that when the release button is depressed the at least one cam profile engages the at least one cam follower to move the hub from the relaxed position to the flexed position.

8. The apparatus of claim 1, the means for retaining the disk on the hub comprising:
at least one retaining lip extending substantially perpendicularly and radially outwardly from a longitudinal axis of the hub.

9. The apparatus of claim 8, the at least one retaining lip defining a retaining surface and an upper surface wherein the retaining surface is adapted to extend above an upper surface of the disk when the disk is on the hub with the hub in its relaxed position and wherein the upper surface is substantially beveled.

10. The apparatus of claim 3, the means for securing the disk comprising:
at least one stem extending substantially perpendicularly from the spine, the at least one stem having a distal end adapted to extend above an upper surface of the disk at a peripheral edge of the disk.

11. The apparatus of claim 10, the means for securing the disk further comprising:
at least one plate affixed to the front cover and extending substantially parallel to a planar surface defined by the front cover, the at least one plate adapted to extend above the upper surface of the disk at the peripheral edge of the disk.

12. The apparatus of claim 11, the at least one plate comprising at least one protuberance extending from an upper surface of the at least one plate.

13. The apparatus of claim 11, the at least one plate comprising a plurality of protuberances extending from an upper surface of the at least one plate, the plurality of protuberances defining a radius of curvature that is substantially the same as a radius of curvature defined by the disk.

14. The apparatus of claim 2, the means for biasing comprising:
at least one cantilever arm disposed in the base panel, the at least one cantilever arm having a distal end adapted to engage a lower surface of the disk.

15. The apparatus of claim 2 further comprising:
a support ring disposed within the base panel; and
a stabilizing shoulder disposed within the support ring.

16. The apparatus of claim 7 further comprising:
means for retaining the release button on the hub.

17. An apparatus for releasably holding a media storage disk comprising:
a front cover;
a base cover;
a spine connecting the front cover and the base cover so that the front cover and the base cover are moveable between an open position and a closed position;
a support ring disposed within the base cover;
means for securing the disk within the support ring when the front cover and the base cover are in the closed position;
a hub disposed within the base cover, the hub moveable between a relaxed position and a flexed position, the hub comprising at least one floating segment;
means for supporting the hub within the base panel so that the at least one floating segment moves substantially laterally between the relaxed position and the flexed position;
means for retaining the disk on the hub; and
means for releasing the disk from the hub whereby depressing the means for releasing causes the at least one floating segment to move substantially laterally from the relaxed position to the flexed position such that the means for retaining the disk on the hub is moved substantially laterally a distance sufficient to allow the disk to be removed from the hub.

18. The apparatus of claim 17 further comprising:
a stabilizing shoulder disposed within the support ring; and
the means for securing the disk comprising:
at least one stem extending substantially perpendicularly from the spine, the at least one stem having a distal end adapted to extend above an upper surface of the disk at a peripheral edge of the disk when the disk is seated on the stabilizing shoulder.

19. The apparatus of claim 17 further comprising:
a stabilizing shoulder disposed within the support ring; and
the means for securing the disk comprising:
at least one plate extending substantially parallel to a planar surface defined by the front cover, the at least one plate adapted to extend above an upper surface of the disk at a peripheral edge of the disk when the disk is seated on the stabilizing shoulder.

20. The apparatus of claim 19, the at least one plate comprising a plurality of protuberances extending from an upper surface of the at least one plate, the plurality of protuberances defining a radius of curvature that is substantially the same as a radius of curvature defined by the disk.

21. The apparatus of claim 17, the means for retaining the disk on the hub comprising a plurality of retaining lips extending substantially perpendicularly and radially outwardly from a longitudinal axis of the hub, each of the plurality of retaining lips defining a retaining surface and an upper surface wherein the retaining surface is adapted to extend above an upper surface of the disk when the disk is on the hub with the hub in its relaxed position and wherein the upper surface is substantially beveled.

22. The apparatus of claim 17, the means for releasing the disk from the hub comprising:

at least one cam follower disposed on the hub; and a release button comprising at least one cam profile adapted to cooperatively engage the at least one cam follower such that when the release button is depressed the at least one cam profile engages the at least one cam follower to move the at least one floating segment substantially laterally from the relaxed position to the flexed position.

23. The apparatus of claim 22 further comprising:

means for biasing the disk upwardly when the disk is retained on the hub.

24. The apparatus of claim 23, the means for biasing comprising:

at least one cantilever arm disposed in the base panel, the at least one cantilever arm having a distal end adapted to engage a lower surface of the disk.

25. The apparatus of claim 22 further comprising:

means for retaining the release button on the hub.

* * * * *